(No Model.)

W. GATES.
GRAIN ADJUSTER OR BUTTER FOR BINDERS.

No. 593,575. Patented Nov. 16, 1897.

Witnesses:
F. G. Fischer

Inventor
Wm Gates
By Higdon & Higdon
Attys.

UNITED STATES PATENT OFFICE.

WILLIAM GATES, OF MULBERRY, MISSOURI.

GRAIN ADJUSTER OR BUTTER FOR BINDERS.

SPECIFICATION forming part of Letters Patent No. 593,575, dated November 16, 1897.

Application filed September 12, 1896. Serial No. 605,684. (No model.)

*To all whom it may concern:*

Be it known that I, WILLIAM GATES, of Mulberry, in the county of Bates and State of Missouri, have invented certain new and useful Improvements in Grain Adjusters or Butters for Binders, of which the following is a full, clear, and exact description, reference being had to the accompanying drawings, forming a part thereof.

My invention relates to grain adjusters or butters for harvesting-machines; and my object is to produce an attachment of this character which may be easily secured in or removed from operative position, and which is positive and reliable in operation, and simple, strong, durable, and inexpensive of manufacture.

In order that the invention may be fully understood, reference is to be had to the said drawings, in which—

Figure 1:
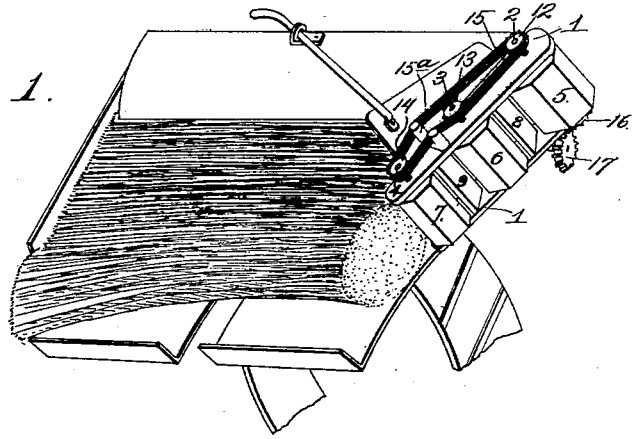
Figure 2:
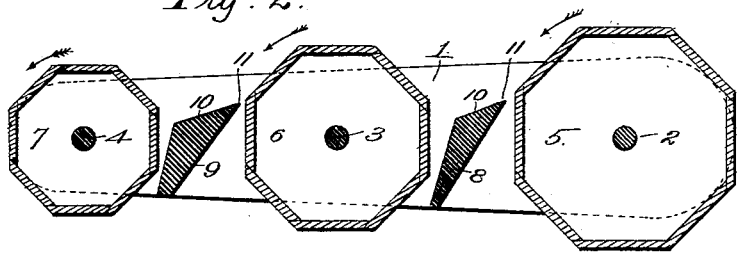
Figure 3:
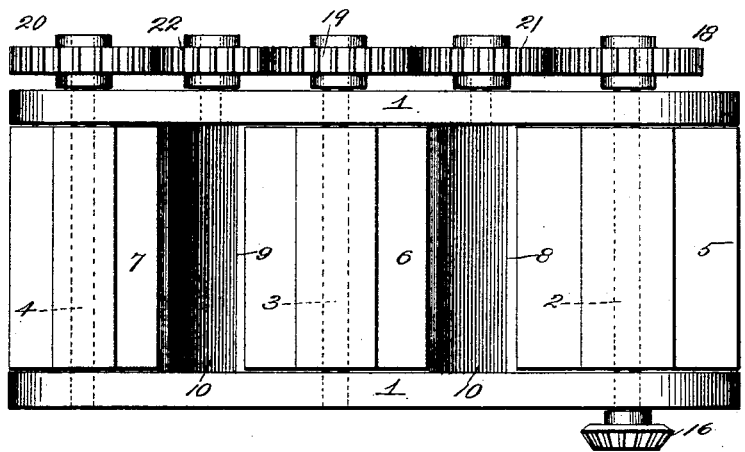

Figure 1 represents a perspective view of a portion of a grain-harvester provided with an adjuster or butter embodying my invention. Fig. 2 is a cross-section of the attachment on an enlarged scale. Fig. 3 is a side view of the same.

Referring to said drawings in detail, 1 1 designate the parallel top and bottom bars or framework of my improved grain-butter, and journaled at their opposite ends in said bars are the parallel shafts 2, 3, and 4. Mounted rigidly upon said shafts, respectively, are the rollers 5, 6, and 7, which rollers are preferably octagonal in cross-section and diminished successively in diameter, the roller 5 being of greater diameter than the roller 6, and the latter than the roller 7.

Interposed between the rollers 5 and 6 and 6 and 7, respectively, and extending from one bar 1 to the other, are the guide-bars 8 and 9. Said guide-bars are, by preference, triangular-shaped in cross-section and are disposed obliquely between the rollers—that is to say, they slant downward and outward with respect to the rollers and the position of the "adjuster" or "butter" as a whole on the binder—and their inner surfaces 10 slant or slope outward and downward from the rollers 5 and 6, respectively, said surfaces being of such superficial area as to almost reach from one roller to the other.

In practice this butter is mounted upon the harvester at its grain side, as shown in Fig. 1, so that the surfaces 10 are presented toward the ends of the grain and the roller 5 occupies the highest plane.

Upon the upper ends of shafts 2, 3, and 4, respectively, are mounted the sprocket-wheels 12, 13, and 14, and connecting said wheels is an endless chain 15, whereby motion imparted to one is communicated to the others, and said chain is provided with a tension device 15ª, as shown, or of any other suitable or preferred construction.

Mounted upon the lower end of the shaft 2 is a beveled gear 16, which is driven by a similar beveled gear 17 upon one of the operating-shafts of the machine.

In case it is desired to dispense with the sprocket-chain gearing, I may mount upon the upper ends of the shafts 2, 3, and 4 the cog-wheels 18, 19, and 20 and connect them by the intermediate idle gear-wheels 21 and 22, as shown in Fig. 3.

In practice, as the grain descends, as illustrated in Fig. 1, the rollers rotate in the direction indicated by the arrows, Fig. 2, and engage the butts of the grain and force it endwise toward the opposite end of the machine, the first wheel deflecting it past the point 11 of the guide-bar 8 and the second wheel taking it from the opposite end of the surface 10 of said guide-bar and delivering it past the point 11 upon the surface 10 of the guide-bar 9, from which it is received by the small roller 7. By this arrangement the butts of the grain are kept substantially even until the bundle-tying mechanism receives it and secures it reliably in bundles in the customary manner. Thus it will be seen that I have produced a grain adjuster or roller which is positive and reliable in operation, which can be attached to all harvesting-machines, and which is simple and inexpensive of manufacture.

It is to be understood, of course, that while I have described and shown the rollers as of octagonal form, they may be cylindrical, hexagonal, or of other form, and that other slight changes in the form and detail construction and arrangement of the parts may be made without departing from the spirit and scope or sacrificing any of the advantages of my invention.

Having thus described the invention, what I claim as new, and desire to secure by Letters Patent, is—

1. A butter for grain-harvesters, comprising a series of rollers having flat surfaces, rotating in the same direction at the front end of the grain side of a harvester, and guide-bars interposed between said rollers, substantially as described.

2. In combination with a harvesting-machine, a grain-butter, comprising a pair of bars, shafts journaled therein, and geared together, rollers having flat surfaces, mounted rigidly on said shafts, bars interposed between said rollers and connecting the first-named bars, and means for rotating said rollers, substantially as shown and described.

In testimony whereof I affix my signature in presence of two witnesses.

WILLIAM GATES.

Witnesses:
G. Y. THORPE,
M. A. MURRAY.